United States Patent [19]

Ackley

[11] 3,884,143
[45] May 20, 1975

[54] CONVEYOR LINK FOR TABLET PRINTING APPARATUS

[75] Inventor: Edward M. Ackley, Stone Harbor, N.J.

[73] Assignee: R. W. Hartnett Company, Philadelphia, Pa.

[22] Filed: Sept. 4, 1973

[21] Appl. No.: 393,963

[52] U.S. Cl. ............... 101/37; 101/35; 101/407 R; 198/131
[51] Int. Cl. ............................................. B41f 17/36
[58] Field of Search ............................. 101/35–40, 101/407 R; 198/131

[56] References Cited
UNITED STATES PATENTS

| | | |
|---|---|---|
| 2,931,292 | 4/1960 | Ackley ................................. 101/37 |
| 3,034,432 | 5/1962 | Typrowicz ....................... 101/407 R |
| 3,042,183 | 7/1962 | Ackley ........................... 198/33 R X |
| 3,108,712 | 10/1963 | Hall ..................................... 221/172 |
| 3,272,118 | 9/1966 | Ackley ................................. 101/37 |

Primary Examiner—Clifford D. Crowder

[57] ABSTRACT

A tablet carrier link for precision printing apparatus for printing a multiplicity of objects of similar size and shape. The link includes a supporting base which is connectable to a conveyor and has a hollow body portion providing a space for the object. At least one side of the link is open and exposes a part of each object to contact by a printing roll. Special passageways are provided for the introduction and removal of the objects into and from the link, and special recesses are provided which avoid smearing of the printed indicia as the objects are discharged from their links.

5 Claims, 6 Drawing Figures

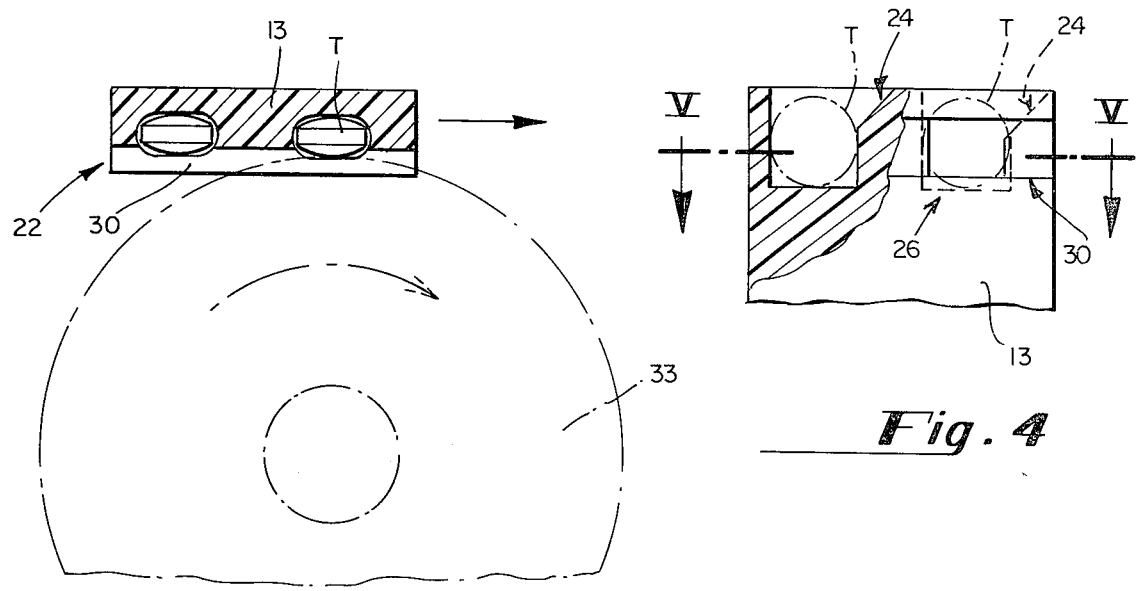
Fig. 4
Fig. 5
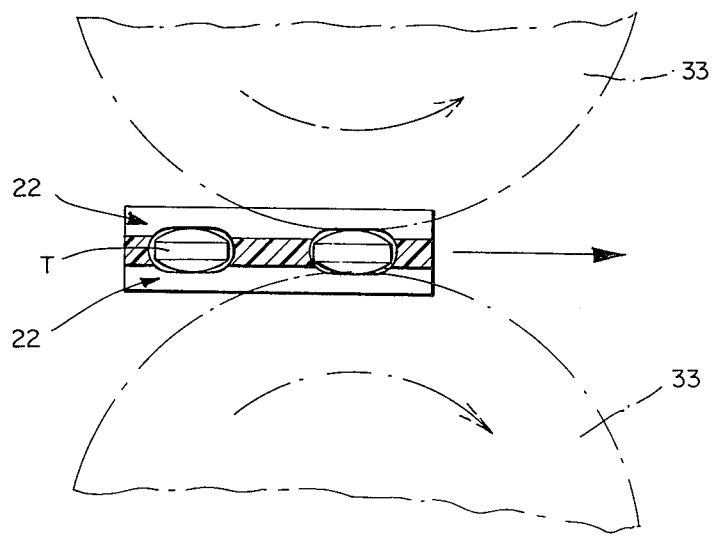
Fig. 6

CONVEYOR LINK FOR TABLET PRINTING APPARATUS

BRIEF DISCUSSION OF THE PRIOR ART

Precision printing machines for capsules, tablets and other pharmaceutical and other objects have enjoyed considerable usage in recent years. One example of such an apparatus appears in the Patent to Ackley U.S. Pat. No. 2,931,292, dated Apr. 5, 1960. In the apparatus shown in that patent, a continuous conveyor belt is provided for collecting a multiplicity of objects from a hopper, carrying them in individual carriers on the conveyor in spaced apart relationship with each other, and conveying them continuously into and out of contact with one or more printing rolls for continuously printing successive objects on one or both sides.

In order to accommodate articles of different sizes and shapes, removable links have been provided for the conveyor belt, each link having a cavity which is shaped to conform to the shape of the lower portion of the article being carried in order to support the article in proper position while it is being printed. Various mechanical linkages have been provided for connecting the article carriers to, and disconnecting them from, the continuous conveyor.

Considerable difficulty has been encountered in properly holding a tablet which is generally disk shaped, and wherein the sides of the disk are relatively flat. Heretofore it has been conventional to provide tablets with rather heavy coatings, and the so-called sugar coated tablets have curved sides which bulge rather promanently outwardly. Such tablets with bulged sides have been relatively easy to support in the carrier during the printing process, and in conveying the tablets to and from the printing roll, because of the prominence of this curvature. However, the disk shaped tablets with rather flat sides are very difficult to maintain in position when standing on edge, and are very difficult to print on one side or both, because it is necessary for the printing roll to extend rather deeply into the carrier area in order to reach the surface area upon which the printing is to be applied.

OBJECTS OF THE INVENTION

It is accordingly an object of this invention to provide a tablet carrier link which is specially adapted for the printing of tablets and other objects which are generally disk shaped and which have rather flat sides.

Another object is to provide readily attachable and detachable tablet carrier links which can readily be used with existing pharmaceutical printing machines.

Still another object of this invention is to provide a tablet carrier link which reliably collects tablets which are arranged at random in a tablet hopper of a tablet printing machine, and which maintains the tablets in an ideal position for printing on one side, or both, and which provides for the release of the tablets without smearing the printing indicia after printing has been accomplished.

Other objects and advantages of this invention, including the low cost and interchangeability of the same, will further become apparent hereinafter and in the drawings.

DRAWINGS

FIG. 4 is a fragmentary view in side elevation, with a portion removed and shown in section in order to reveal important details, of the carrier link as shown in FIGS. 2 and 3;

Figure 1:
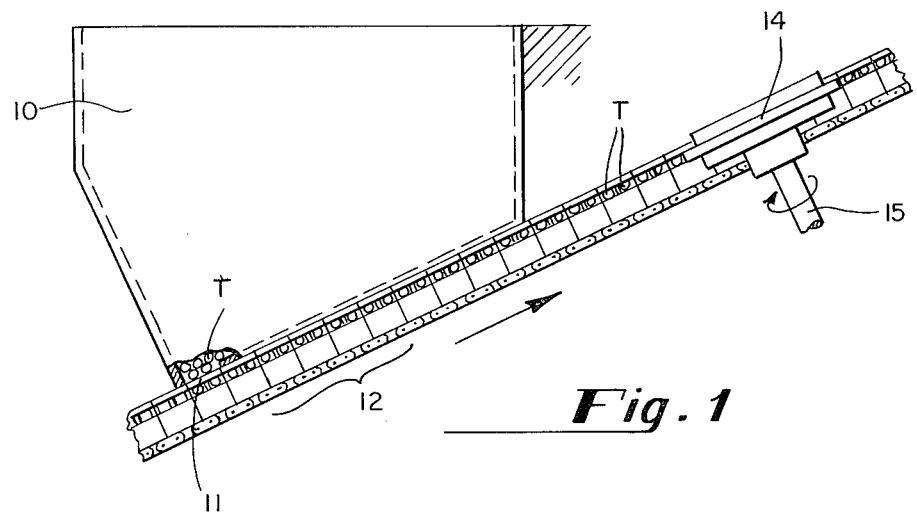
FIG. 1 represents a partial schematic view in side elevation showing a portion of a tablet printing apparatus including carrier links constructed in accordance with this invention.

FIG. 5 is a view looking down upon the carrier link, indicating the manner in which the printing roll contacts the tablets within such link, certain parts of the link being broken away and shown in section as indicated by the lines and arrows V—V which appear in FIG. 4, and FIG. 6 is a view similar to FIG. 5 showing a modified form of the apparatus ideally adapted for printing the tablets on both sides.

DETAILED DESCRIPTION OF THE INVENTION

Although specific forms of tablet carrier links have been shown in the drawings and will be described in specific terms in this portion of the specification, it is to be understood that the following description is not intended to limit the scope of the invention as defined in the appended claims. Further, in referring to the objects which are to be printed in accordance with this invention, the word "tablet" is used in the interest of brevity and it will be appreciated that this term is intended to apply to pharmaceutical and other objects of all sorts, provided they are all of approximately the same size and shape.

Referring to FIG. 1 of the drawings, the number 10 designates a hopper carrying a plurality of tablets T which communicate through opening 11 with a conveyor belt 12 carrying a plurality of tablet carrier links 13. A printing roll 14 is driven by a motor, not shown, for rotation about the shaft 15, in order to apply printed indicia on the tablets T which are carried within the carrier links 13. The printing roll and the manner in which it may receive ink indicia from an engraved roll are themselves well known, and the details of this portion of the apparatus are not shown. Reference is again made to the patent to Ackley U.S. Pat. No. 2,931,292.

Figure 2:
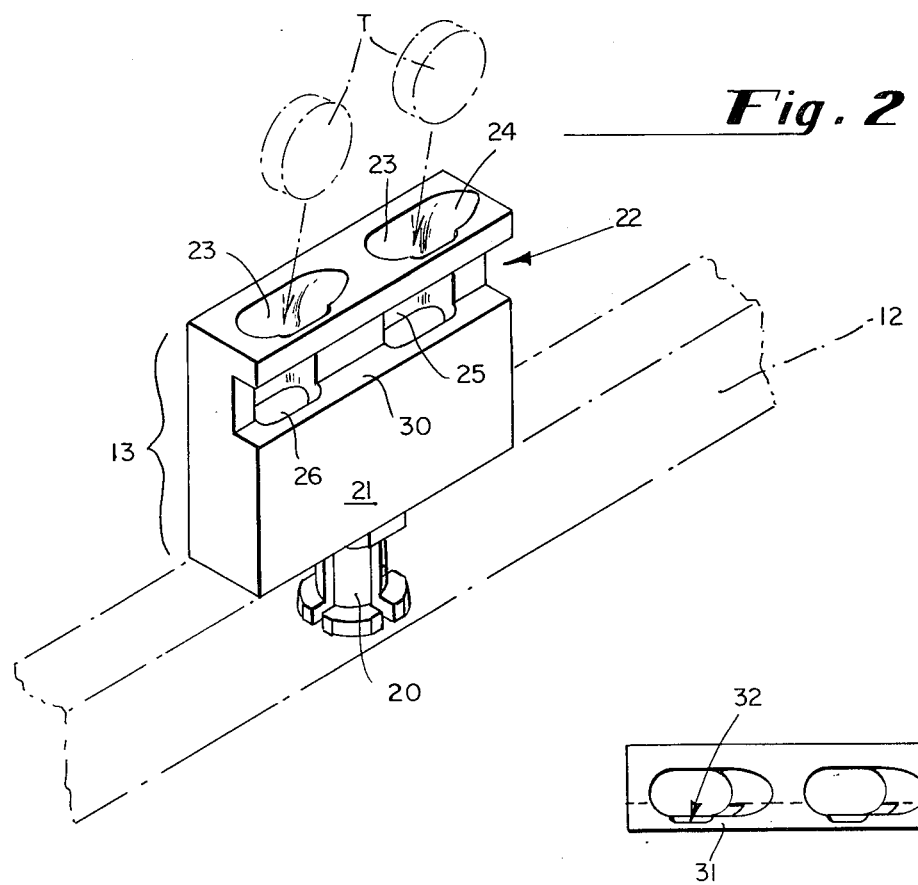
FIG. 2 represents an enlarged view in perspective showing the important details of a carrier link which embodies features of this invention.

Turning to FIG. 2 of the drawings, the details of a form of carrier link which is ideally adapted for printing the tablets on one side only are shown. This link has expandable flexible clips forming a base 20, and has a body portion 21 connected to the base. The body portion of the link 13 has a longitudinally-extending trough 22 which is shaped to provide access to the printing roll 14 previously identified in connection with FIG. 1. It will be appreciated that the link 13 is connected by the base 20 to the continuously moving conveyor belt 12, and is continuously moved in this manner past the printing roll 14 which extends into the trough 22 and rotates for contact with the tablets T within the link 13.

As appears in FIG. 2, the particular link 13 there shown is arranged to carry two tablets in separate cavities, each having an opening at the top designated by the number 23. This opening includes curved portions 24 and vertical wall portions 25 for retention of the tablet within the cavity thus formed. Floor portions 26 are provided in these cavities; they are located below the shelf portion 30 of the trough 22.

Figure 3:
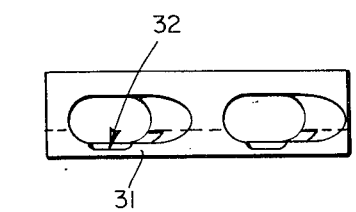
FIG. 3 is a plan view of the carrier link of FIG. 2.

Referring to FIG. 3, it will be seen that the recess is provided in such manner as to form side retainer walls 31 which prevent the tablet from falling toward the printing roll at any time, and these walls 31 have recessed portions 32 which are spaced inwardly from the inward surface of the wall 31 and which serve to provide free space through which the tablets may move when they are being discharged from the links 13, without smearing the ink that has been applied to the surface of the tablet in the course of the printing operation.

FIG. 5 shows the manner in which the printing roll 33 extends into the trough 22 in a manner to contact a tablet T carried by the carrier link 13.

FIG. 4 shows the manner in which the depth of floor portions 26, coupled with the height of the shelf 30, forms a retaining wall to maintain the tablet in position in the link 13. FIG. 4 also shows clearly the inclined surface 24 which provides for ready passage of the tablets T into and out of the spaces provided by the link 13.

The apparatus shown in FIG. 6 of the drawings is similar to those previously shown and described, but is provided with openings on both sides, each of which is constructed in a manner similar to that appearing in FIG. 2. In FIG. 6 there are two troughs 22, one on each side, and two printing rolls 33 are provided, one on each side, in order to provide printed indicia simultaneously on opposite sides of the tablet T.

Accordingly, it will be appreciated that an apparatus according to this invention can be used either for precision or nonprecision printing work, and can be used for pharmaceutical objects, chewing gum, metal objects and other articles of various size and shapes, so long as all the objects that are used in a particular printing run are all of approximately the same size and shape. Carrier links in accordance with this invention are ideally adapted for holding in place objects which are difficult to maintain in position by reason of their physical shapes. Further, objects can be carried in carrier links of this invention without requiring precision settings relative to the printing rolls and yet the objects are projected as they are taken from the hopper and as they pass through the printing area. The side guides that are provided on the links are moving continuously with the tablet being printed, and therefore there is no rubbing between the two. The guide, according to this invention, also protects fragile tablets from nicking or breaking in the course of the collecting and printing operation.

Although this invention has been described in connection with a particular printing machine wherein a continuous conveyor is used, it will be appreciated that the carrier links may be applied to various forms of counting and filling machines as well as printing machines and to conveyor belts of various types. It will further be appreciated that the objects may be printed on one side or the other.

Further, various other modifications may be made, including the substitution of equivalent elements for those shown and described, and the use of certain features independently of other features, all without departing from the spirit and scope of this invention as defined in the appended claims.

I claim:

1. In an apparatus for printing indicia on objects of substantially uniform size and shape, which apparatus includes continuously operable conveyor means and printing means adjacent said conveyor means for applying such indicia while said objects are moving along on said conveyor means, a carrier for at least one of said objects, said carrier comprising a supporting base connectable to said conveyor and a body portion supported by said base, said body portion having a recess extending along the direction of movement of said conveyor and shaped to accommodate and receive said printing means therein while said carrier is moving relative to said printing means, and said body portion also having a passageway which is open at an upper portion of said body portion, said passageway extending downwardly within said body portion forming a cavity having an object-supporting floor located below at least a part of said recess, said cavity opening into said recess for communication therebetween, and said body portion having retainer means spaced apart from one another at a distance less than a predetermined dimension of said object in a manner to limit movement of said object out of said passageway in the direction of said recess, said retainer means being provided with an indentation shaped to provide spacing between said retainer means and printed portions of said object, thereby providing for passage of said object out of said passageway without smearing the printed surface of said object against said retaining means.

2. The apparatus defined in claim 1, wherein said passageway includes an inclined wall formed in the upper body portion of said carrier.

3. The apparatus defined in claim 1, wherein a pair of said recesses are provided, extending along opposed sides of said carrier.

4. The apparatus defined in claim 1, wherein said retainer means includes an upper portion and a lower retainer wall spaced from the upper portion of said retainer means closer than are the upper and lower extremities of said object.

5. The apparatus defined in claim 4, wherein said upper portion and lower wall are spaced from one another at a distance greater than the width of said printing means.

* * * * *